Patented Mar. 24, 1936

2,035,123

UNITED STATES PATENT OFFICE 2,035,123

ALDEHYDE SYNTHETIC RESINS PREPARED FROM PETROLEUM

Stewart C. Fulton, Elizabeth, N. J., assignor to Standard Oil Development Company, a corporation of Delaware No Drawing. Application June 20, 1932, Serial No. 618,302

20 Claims. (Cl. 260—3)

This invention relates to the preparation of resins from petroleum hydrocarbons by reaction with aldehydes and to the products obtained thereby. By the invention transparent and light colored resins completely soluble in petroleum solvents may be obtained by reacting petroleum hydrocarbons and aldehydes, especially formaldehyde, in the presence of condensing agents of suitable activity to permit control of the reaction.

The term "resin" is used in connection with this invention to denote a product completely soluble in "Varsol" (a water white petroleum naphtha fraction with an Abel flash point above 100° F. and boiling below 410° F.) and possessing the ordinary characteristics of resinous bodies.

When petroleum oils are reacted with formaldehyde in the presence of condensing agents such as sulfuric acid, ferric chloride, aluminum chloride and the like, a product is obtained which consists largely of dark colored insoluble and infusible bodies frequently called "resinites" or "formolites". Sulfuric acid especially appears to be an agent of uncontrollable condensing activity when used alone. With ferric chloride and aluminum chloride less violent reaction results but the yield of resin is very small, generally below 5 or 10%, and the quality poor. It has now been found that greatly increased yields of resins of improved qualities may be obtained if the oil and aldehyde reaction is conducted in the presence of a mixed condensing agent containing a strong condensing agent such as sulfuric acid, ferric chloride, aluminum chloride and the like and in addition a weakly acid substance. The weak acid appears to have a double effect. It damps the activity of the strong condensing agent causing the reaction to proceed much more smoothly, and also appears to serve as an activator or a promoting agent for the production of resins since greatly increased yields of the desired resins results. These weakly acidic substances, causing an increase in the yield and quality of the resins when added to strong condensing agents used for resin production according to the process herein described, probably acting as mutual solvents, are classified for the purpose of this invention as "promoters". Acetic acid is an especially desirable promoter. Among other promoters are phosphoric acid, butyric acid, propionic and other fatty acids and generally acids and acid salts having dissociation constants for the first hydrogen ion of about $10^{-1}$ to $10^{-7}$.

In the preferred method for preparing resins according to the present invention, a petroleum oil fraction is reacted with an aqueous solution of an aldehyde in the presence of condensing agents of the type above described. In such a process the condensing agent is necessarily in a hydrated form and is accordingly quite different in character and activity from corresponding anhydrous condensing agents such as concentrated sulfuric acid, and anhydrous aluminum chloride.

Resins may be prepared with my process from petroleum oils and fractions thereof containing appreciable amounts of cyclic hydrocarbons and other compounds having the property of condensing with the aldehydes. Such fractions may be obtained by distillation, extraction, or other suitable means of naturally occurring petroleum oils and products of cracking, oxidation, hydrogenation, dehydrogenation, and destructive hydrogenation thereof. Any aldehyde is suitable which has the property of condensing with cyclic hydrocarbons to form resinous products. The aldehydes may be used as such or in polymerized forms. Preferred aldehydes are formaldehydes, as paraformaldehyde or in aqueous solution, acetaldehyde, furfural.

It has been found that improved resins of light color may be prepared by subjecting the petroleum fraction to an initial treatment with a condensing agent in order to remove the color-forming bodies and other highly active constituents which readily condense to form insoluble and infusible bodies. The treated oils partially or completely freed of such bodies are then subjected to reaction with aldehyde according to the herein described process. This initial treating step may be conducted with sulfuric acid, aluminum chloride, decolorizing clay and other refining methods in common practice. A small amount of aldehyde may be added during the preliminary treatment and is of advantage in removing the highly reactive bodies which form insoluble dark colored products. This pretreatment should be insufficient for the removal of any considerable quantity of the resin-forming bodies present in the oil.

The following examples illustrate methods for preparing the improved resins.

*Example 1*

A cracking coil tar obtained in cracking a petroleum gas oil at 750 pounds pressure is subjected to a vacuum distillation. The fraction distilling between 150° and 190° C. (vapor temperature) at 1 mm. pressure is agitated with 5% by volume of 66° Bé. sulfuric acid. The sludge is allowed to settle and is removed. The treated oil is then washed or filtered or subjected to other suitable treatment to remove any finely divided sludge remaining in suspension in the oil. 1000 parts by volume (972 parts by weight) of this oil are then mixed with 900 parts by volume of glacial acetic acid, 100 parts of 66° Bé. sulfuric acid, and 200 parts of an aqueous solution of 39% formaldehyde (formalin). The mixture is agitated under reflux at a temperature of 100 to 105° C. for about 3 hours. It is then allowed to settle while hot and the acid layer is separately withdrawn. 1000 parts of "Varsol" are added to the remaining oil layer which is then neutralized with strong aqueous caustic and washed with water. Only traces of insoluble material are formed by the reaction with formaldehyde under these conditions and these are removed during the above separation. The washed oil is then distilled to an end point of 310° C. at about 1 to 5 mm. pressure to remove the oil as a distillate and there is obtained as bottoms 504 parts by weight of resin of 125° C. softening point (ball and ring method) completely soluble in "Varsol" and substantially insoluble in acetone.

*Example 2*

As an alternative method, the oil layer after the above separation from the acid layer is diluted with 1000 parts of "Varsol" and is then agitated with 100 parts by volume of 66° Bé. sulphuric acid. The resulting sludge is separately removed and the oil is then contacted with 5% by weight of decolorizing clay based on the original oil used for reaction with formaldehyde. The filtered oil is then distilled to the same end point as in Example 1 and there is obtained 339 parts by weight of a light reddish colored transparent resin completely soluble in "Varsol" and having a softening point of 120° C. by the ball and ring method.

*Example 3*

A resin completely soluble in "Varsol" and having a softening point of 145° C. is prepared directly from the intermediate cracking coil tar fraction by the method described in Example 1 omitting the preliminary sulfuric acid treatment. This resin is relatively dark in color and is transparent only in very thin layers of about 1 mm. thickness.

The resin obtained in Example 1 is four times lighter in color than that of Example 3. The resin obtained in Example 2 is ten times lighter than that obtained in Example 3.

*Example 4*

A cracking coil tar distillate similar to that used in Example 1 is treated with acid and then caused to react with formalin under the same conditions shown in Example 1. After removal of the acid layer the remaining oil layer is neutralized with strong aqueous caustic and then washed with water. To this washed oil is added three volumes of a petroleum ether boiling from 30 to 70° C. The mixture is thoroughly agitated and then filtered to remove insoluble matter. The filtrate is distilled to about 310° C. at 1 mm. pressure. There is thus obtained as a distillation residue a light colored resin comparable in color and softening point to the acid and clay treated product of Example 2. The yield of this resin is 35% by weight, based on the original acid treated oil. The material insoluble in petroleum ether is extracted with "Varsol" to yield 10% of a somewhat darker colored resin.

The proportion of acetic acid and sulfuric acid may vary greatly in the condensing agent used for the oil-formaldehyde reaction. It is desirable that the volume of acetic acid be at least equal to that of the sulfuric acid and generally 5 to 9 volumes acetic acid per volume of sulfuric acid are preferred. The reaction temperature may be higher or lower than that described and will depend to some extent on the reactivity of the oil and aldehyde and the activity of the condensing agent used. The reaction temperature should generally be not below about 50° C. for satisfactory operation. Temperatures above 100° C. may be used at suitably elevated pressures to maintain the petroleum oil and condensing agent in liquid phase.

While cracked oils, tars and tar distillates are suitable, it has been observed that increased yields of resins of improved quality are obtained from oils cracked at very high pressures. For example, a 45% by weight yield of resin was obtained from a cracking coil tar fraction cracked at 750 pounds per square inch pressure while a 52% yield of resin was obtained under the same reaction conditions from a corresponding tar fraction cracked at 950 pounds per square inch pressure.

This invention is not to be limited to any theories of the reactions or the composition of the products described herein, nor to any examples which have been given solely for purpose of illustration but only by the following claims in which I wish to claim all novelty insofar as the prior art permits.

I claim:

1. Method for preparing resins which comprises reacting a cracked petroleum oil fraction boiling above 150° C. at one mm. mercury absolute pressure with formaldehyde in the presence of a strong condensing agent of the class of sulfuric acid, aluminum chloride, ferric chloride and a promotor consisting of an acid having a dissociating constant for the first hydrogen ion of about $10^{-1}$ to $10^{-7}$.

2. Method for preparing resins which comprises reacting a viscous petroleum oil fraction containing cyclic hydrocarbons with formalin in the presence of a strong condensing agent of the class of sulfuric acid, aluminum chloride, ferric chloride and a promoter consisting of an acid having a dissociation constant for the first hydrogen ion of about $10^{-1}$ to $10^{-7}$.

3. Method for preparing resins which comprises reacting a cracked petroleum oil tar fraction with formalin in the presence of a condensing agent consisting of sulfuric acid and a greater quantity of acetic acid.

4. Method according to claim 3 in which the condensing agent contains about 9 parts of acetic acid per part of sulfuric acid.

5. Method for preparing a resin which comprises reacting a distillate fraction of a cracked petroleum tar boiling below 350° C. at 1 mm. pressure with formalin in the presence of a condensing agent consisting of sulfuric acid and a greater quantity of acetic acid.

6. A resin prepared by reaction of formaldehyde with cracked petroleum oil fractions, boiling above 150° C. at one mm. mercury absolute pressure, completely soluble in petroleum hydrocarbons and substantially insoluble in acetone.

7. A transparent light colored resin prepared by reaction of formaldehyde with cracked petroleum oil fractions, boiling above 150° C. at one mm. mercury absolute pressure, completely soluble in a water white petroleum naphtha fraction with an Abel flash point above 100° F. and boiling below 410° F., and having a softening point above 100° C.

8. Method for preparing resins which comprises reacting a petroleum oil fraction containing cyclic hydrocarbons with an aldehyde in the presence of a strong condensing agent of the class of sulfuric acid, aluminum chloride and ferric chloride and a fatty acid promoter.

9. Method according to claim 8, carried out under superatmospheric pressure.

10. Method according to claim 8, carried out at a temperature above 50° C.

11. Method according to claim 8 in which said aldehyde is formaldehyde.

12. Method according to claim 8 in which said aldehyde is an aqueous solution of formaldehyde.

13. Method according to claim 8 in which said strong condensing agent is sulfuric acid.

14. Method according to claim 8 in which said fatty acid is acetic acid.

15. Method for preparing resins which comprises reacting a petroleum oil fraction containing cyclic hydrocarbons with aqueous formaldehyde in the presence of a mixture of sulfuric acid and acetic acid.

16. In the preparation of light colored resins from petroleum fractions containing cyclic hydrocarbons, by reaction with an aldehyde in the presence of a strong condensing agent of the class of sulfuric acid, aluminum chloride and ferric chloride, and a fatty acid promoter, the step of first subjecting said petroleum fraction to a mild refining treatment to remove therefrom color-forming bodies and highly unstable constituents but incapable of removing all the said resin-forming bodies.

17. Method according to claim 16 in which said refining treatment consists in treating said petroleum fraction with sulfuric acid.

18. Method according to claim 16 in which said refining treatment is conducted in the presence of added aldehyde.

19. Method according to claim 16 in which said refining treatment consists in treating said petroleum fraction with aluminum chloride.

20. Method according to claim 16 in which said refining treatment consists in treating said petroleum fraction with a de-colorizing clay.

STEWART C. FULTON.